United States Patent
Owen, III et al.

(10) Patent No.: US 8,568,039 B2
(45) Date of Patent: Oct. 29, 2013

(54) FIBER-OPTIC CONNECTOR

(75) Inventors: Joseph McLellan Owen, III, Derry, NH (US); David Paul Kelly, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 279 days.

(21) Appl. No.: 12/819,421

(22) Filed: Jun. 21, 2010

(65) Prior Publication Data

US 2011/0311183 A1    Dec. 22, 2011

(51) Int. Cl.
*G02B 6/38* (2006.01)

(52) U.S. Cl.
USPC ............... 385/62; 385/60; 385/78; 385/81

(58) Field of Classification Search
USPC .................................... 385/62, 81
See application file for complete search history.

(56) References Cited

U.S. PATENT DOCUMENTS

| | | | |
|---|---|---|---|
| 4,836,133 A * | 6/1989 | Wohrle | 118/410 |
| 6,263,133 B1 * | 7/2001 | Hamm | 385/33 |
| 6,821,377 B2 * | 11/2004 | Saito et al. | 156/345.24 |
| 7,217,022 B2 * | 5/2007 | Ruffin | 362/554 |
| 7,387,449 B2 * | 6/2008 | Meyer-Guldner | 385/88 |
| 8,142,082 B2 * | 3/2012 | Oshima et al. | 385/88 |
| 2004/0114891 A1 * | 6/2004 | Guerra et al. | 385/117 |
| 2004/0240802 A1 * | 12/2004 | Tsuchida | 385/93 |
| 2009/0226136 A1 * | 9/2009 | Shimizu et al. | 385/60 |
| 2010/0254655 A1 * | 10/2010 | Bergann et al. | 385/33 |
| 2011/0052126 A1 * | 3/2011 | Yamamoto et al. | 385/92 |

FOREIGN PATENT DOCUMENTS

WO    WO 2009123017 A1 * 10/2009

* cited by examiner

*Primary Examiner* — Michelle R Connelly
(74) *Attorney, Agent, or Firm* — Yudell Isidore Ng Russell; Anthony P. Ng

(57) ABSTRACT

A fiber-optic connector for connecting an optical fiber to other optical assemblies is disclosed. The fiber-optic connector includes a top plate having a window of similar refractive index and transmission index as the material of an optic fiber to be contained within the fiber-optic connector. The fiber-optic connector also includes a ferrule connected to the top plate via multiple spring-loaded screws. The ferrule includes an interface and an insert. The insert is capable of firmly gripping an optical fiber. In order to reduce Fresnel reflection losses of the fiber-optic connector, the window is pre-coated with an anti-reflective surface on the side opposite an optic fiber to be contained within the fiber-optic connector.

16 Claims, 1 Drawing Sheet

FIBER-OPTIC CONNECTOR

STATEMENT OF GOVERNMENT INTEREST

The present invention was made with United States Government support under contract number N00173-05-C-6020 awarded by the U.S. Naval Research Lab. The United States Government has certain rights in the present invention.

BACKGROUND OF THE INVENTION

1. Technical Field

The present invention relates to optical connectors in general, and in particular to a fiber-optic connector having an embedded window for connecting an optical fiber to other optical assemblies.

2. Description of Related Art

A fiber-optic connector is typically utilized to connect an optical fiber to other optical assemblies. A fiber-optic connector commonly includes a ferrule in which an internal optical fiber is housed.

The profile of the end face of an optical fiber can significantly affect its connection characteristics. For example, when an angle (i.e., an angle to the optical fiber axis) of the end face of an optical fiber deviates from a right angle or the end face of an optical fiber is highly roughened, air may enter in a space between the end face of the optical fiber to any subsequent optics. As a result, Fresnel reflection increases at the end face of the optical fiber, and leads to an increase in connection loss of the optical fiber.

One method for preventing the increase in connection loss of an optical fiber due to the roughness of the end face of the optical fiber is by polishing the end face of the optical fiber. However, this method is not suitable when the external optical fiber (such as holey fiber or soft glasses) is very sensitive or when the connection work is conducted at the setting site of the optical fiber because of the necessity of a polishing device and high labor cost.

Another method is to use a refractive index matching agent interposed between the end faces of optical fibers and subsequent optical surfaces. With this method, air can be prevented from entering into the space between the end faces of the two optical fibers. As a result, Fresnel reflection caused by the air can be lowered, and the connection loss of optical fibers can be reduced. However, this method has the following problems. Since the refractive index matching agent is generally formed of a silicone or paraffin agent in liquid or grease state, it can cause undesirable contamination (to holey fibers or high-power fibers). Furthermore, since the refractive index matching agent generally has a temperature dependency in refractive index, transmission loss of optical fibers may vary according to a change in refractive index of the refractive index matching agent. Also, current index matching agents are typically restricted to wavelengths below two microns due either to low refraction index (most have n<1.8) or low transmission index at longer wavelengths.

Yet another common method for reducing Fresnel reflection loss is to treat the surface of an optic fiber with an anti-reflective coating after its assembly into a ferrule. This coating can be applied via vapor deposition. Alternatively, the surface can be mechanically altered to achieve the same effect (i.e., moth-eye microstructure). Unfortunately, some optical fiber materials, such as mid-infrared sensitive glasses, in high-power applications may be unsuitable for this method.

Due to the impracticality of implementing traditional methods for reducing Fresnel reflection loss in certain types of optical fibers, an improved fiber-optic connector would be desirable.

SUMMARY OF THE INVENTION

In accordance with a preferred embodiment of the present invention, a fiber-optic connector includes a top plate having a window of similar refractive index and transmission index as the material of an optic fiber to be contained within the fiber-optic connector. The fiber-optic connector also includes a ferrule connected to the top plate via multiple spring-loaded screws. The ferrule includes an interface and an insert. The insert is capable of firmly gripping an optical fiber. In order to reduce Fresnel reflection losses of the fiber-optic connector, the window is pre-coated with an anti-reflective surface on the side opposite an optic fiber to be contained within the fiber-optic connector.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
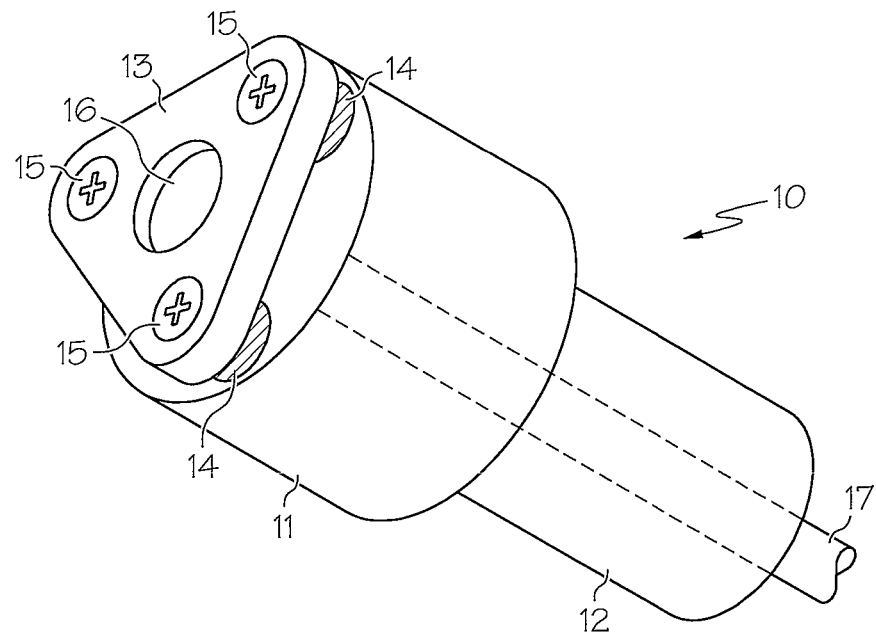
FIG. 1 is an isometric view of a fiber-optic connector, in accordance with a preferred embodiment of the present invention.

Referring now to the drawings and in particular to FIG. 1, there is illustrated an isometric view of a fiber-optic connector, in accordance with a preferred embodiment of the present invention. As shown, a fiber-optic connector 10 includes a ferrule 11 and a housing 12. In addition, fiber-optic connector 10 also includes a top plate 13 and multiple O-rings 14. Ferrule 11 is a cylindrical member with a center hole for receiving an optical fiber. Top plate 13 and O-rings 14 are preferably secured to a front end of ferrule 11 via multiple screws 15. Housing 12 is connected to a back end of ferrule 11.

O-rings 14 act as shock absorbers between top plate 13 and ferrule 11. O-rings 14 can be substituted by RTV silicone gaskets or springs. Although top plate 13 is shown to be in a triangular shape having three screw holes at each apex of the triangle, it is understood by those skilled in the art that top plate 13 can be of any shape with any number of screw holes.

For the present embodiment, top plate 13 is preferably made of steel with a thickness of less than approximately 2 mm. Top plate 13 includes a clear circular window 16 with a diameter of approximately 3 mm. Window 16 can also be in a square shape with a dimension of approximately 3.6 mm×3.6 mm. Window 16 is made of a material that is reflective index-matched and transmission-matched with an optical fiber 17 contained within ferrule 11. On the fiber-facing side (i.e., the side contacting optical fiber 17), window 16 is preferably polished flat and un-coated. On the air-facing side, window 16 is preferably anti-reflection coated by any of methods known in the art.

For the present embodiment, window 16 is an $As_2S_3$ window, and optical fiber 17 is an $As_2S_3$ fiber. Alternatively, window 16 can be a ZnSe window, and optical fiber 17 can be an $As_2S_3$ fiber in order to improve the hardness of the exposed surface along with reducing the reflection losses.

Figure 2:
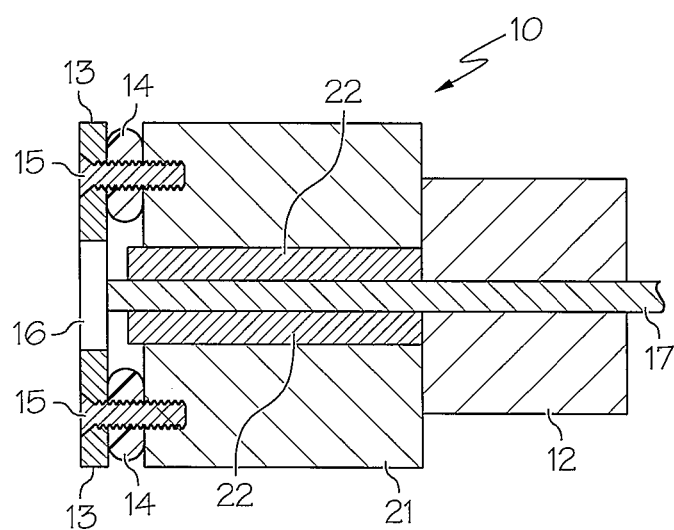
FIG. 2 is a cross-sectional view of the fiber-optic connector from FIG. 1, in accordance with a preferred embodiment of the present invention.

With reference now to FIG. 2, there is depicted a cross-sectional view of fiber-optic connector 10, in accordance with a preferred embodiment of the present invention. As shown, ferrule 11 includes a steel interface 21 and a Zirconia insert 22. The length of protrusion of Zirconia insert 22 from steel interface 21 may vary, depending on the thickness of O-rings 14. Also shown in FIG. 2 is optical fiber 17 contained within Zirconia insert 22.

Before placing optical fiber 17 within ferrule 11, optical fiber 17 may be prepared as follows. The fiber buffer layer of optical fiber 17 is initially stripped to a length appropriate for cleaving (preferably less than 10 cm). Optical fiber 17 is then cleaved and inserted into Zirconia insert 22. Optical fiber 17 is allowed to protrude approximately 100 μm beyond Zirconia insert 22. An epoxy is applied and is allowed to wick up ferrule 11 and cure (slow curing is best). As a result, optical fiber 17 is then glued in place within Zirconia insert 22 via the epoxy.

The choice of epoxy can affect the quality of fiber-optic connector 10, particularly when the epoxy cannot hold optical fiber 17 adequately. Preferably, Epo-Tek® 353ND manufactured by Epoxy Technology Inc. is utilized for the present embodiment. Epo-Tek® 353ND is preferred over other epoxies because of its viscous properties during the cure cycle. For the present embodiment, steel interface 21 is also bonded to Zirconia insert 22 using Epo-Tek® 353ND.

In addition, window 16 is affixed to top plate 13 either with a bonding agent (i.e., silicone RTV) or mechanically. After the epoxy for optical fiber 17 has cured, top plate 13 is affixed loosely to ferrule 11 along with screws 15 and O-rings 14. By using a microscope with normally incident monochromatic light, fringes should be apparent between window 16 and the face of optical fiber 17. Screws 15 can then be tightened until the fringes are reduced to one fringe of green light or less, which indicates that sufficient mechanical and optical contact are in place for infra-red light transmissions. Screws 15 should not be over-tighten in order to avoid crushing optical fiber 17. Screws 15 can also be tacked in place using the above-mentioned epoxy.

As has been described, the present invention provides a fiber-optic connector having an embedded window for connecting an optical fiber to other optical assemblies.

While the invention has been particularly shown and described with reference to a preferred embodiment, it will be understood by those skilled in the art that various changes in form and detail may be made therein without departing from the spirit and scope of the invention.

What is claimed is:

1. A fiber-optic connector comprising:
    a triangular shaped top plate having screws inserted through each tip of said triangular shaped top plate;
    a window contained within said top plate, wherein said window is of substantial refractive index and transmission index as an optical fiber to be contained within said fiber-optic connector; and
    a ferrule connected to said top plate via said screws inserted through corresponding O-rings, wherein said ferrule includes an interface and an insert capable of firmly gripping said optical fiber to be contained within said fiber-optic connector to ensure one end of said optical fiber protrudes beyond said insert is in direct contact with said window.

2. The fiber-optic connector of claim 1, wherein said window is coated with an anti-reflective surface on the side opposite said optical fiber to be contained within said fiber-optic connector.

3. The fiber-optic connector of claim 1, wherein said top plate is made of steel.

4. The fiber-optic connector of claim 1, wherein said top plate has a thickness of less than approximately 2 mm.

5. The fiber-optic connector of claim 1, wherein said interface is made of steel.

6. The fiber-optic connector of claim 1, wherein said insert is made of Zirconia.

7. The fiber-optic connector of claim 1, wherein said insert is glued to said interface via an epoxy.

8. The fiber-optic connector of claim 1, wherein said optical fiber to be contained within said fiber-optic connector is glued to said insert via an epoxy.

9. The fiber-optic connector of claim 1, wherein said ferrule is connected to said top plate via a plurality of spring-loaded screws.

10. The fiber-optic connector of claim 1, wherein said optical fiber to be contained within said fiber-optic connector includes only one optical fiber.

11. An apparatus manufactured by a method comprising:
    stripping a fiber buffer layer of an optical fiber to a predetermined length;
    cleaving and inserting said optical fiber into an insert by allowing said optical fiber to protrude beyond said insert;
    applying an epoxy to said optical fiber to keep said optical fiber remained in place within said insert;
    placing a window within a triangular shaped top plate, wherein said window is of substantial refractive index and transmission index as said optical fiber; and
    securing a ferrule to said triangular shaped top plate via a screw inserted through each tip of said triangular shaped top plate, wherein each screw is inserted through a corresponding O-ring, wherein said ferrule includes an interface and said insert for ensuring one end of said optical fiber is in direct contact with said window.

12. The apparatus of claim 11, wherein said window is coated with an anti-reflective surface on the side opposite said optical fiber to be contained within said fiber-optic connector.

13. The apparatus of claim 11, wherein said top plate is made of steel.

14. The apparatus of claim 11, wherein said interface is made of steel.

15. The apparatus of claim 11, wherein said insert is made of Zirconia.

16. The apparatus of claim 11, wherein said ferrule is connected to said top plate via a plurality of spring-loaded screws.

* * * * *